April 21, 1964   J. RICHTER ETAL   3,129,807
SAFETY DEVICE FOR A MANUFACTURING CONVEYOR
Filed Dec. 27, 1961
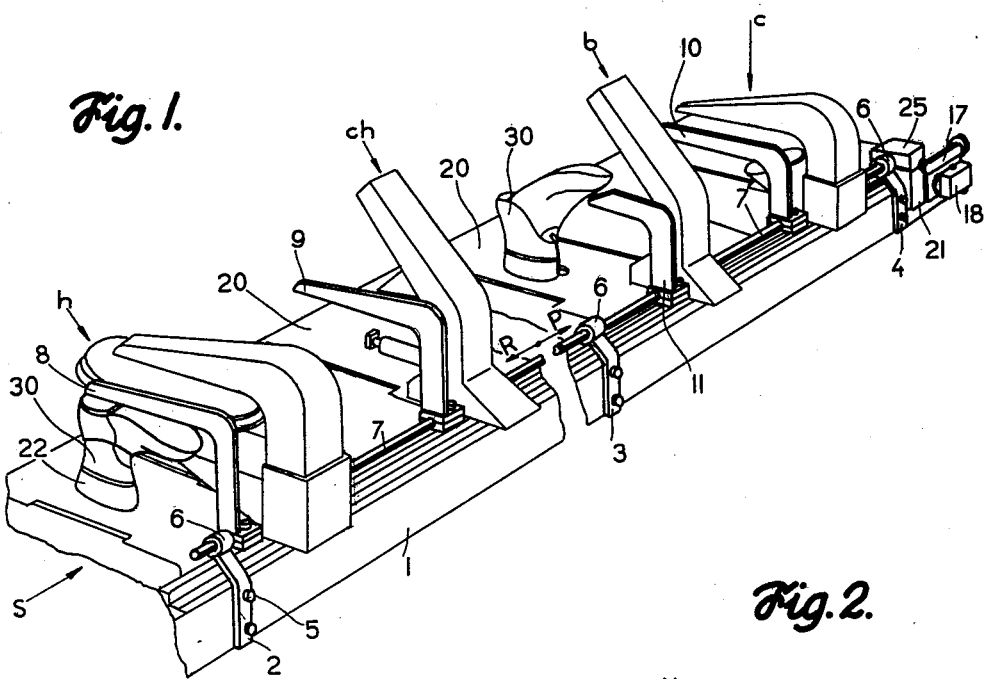
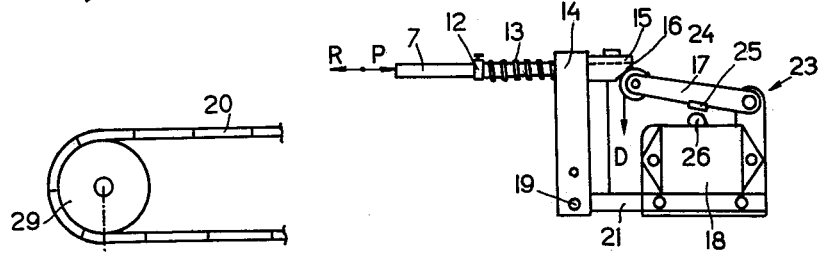
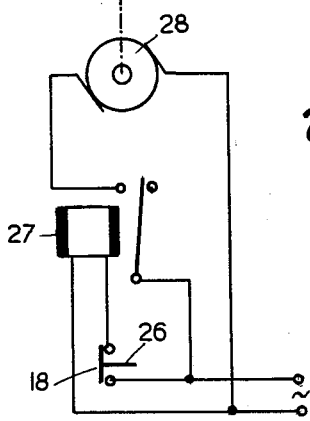
INVENTORS
Jiří Richter, Karel Černoch സ
United States Patent Office 3,129,807
Patented Apr. 21, 1964

3,129,807
SAFETY DEVICE FOR A MANUFACTURING CONVEYOR
Jiří Richter and Karel Černoch, Gottwaldov, Czechoslovakia, assignors to Svit, narodni podnik, Gottwaldov, Czechoslovakia
Filed Dec. 27, 1961, Ser. No. 162,514
Claims priority, application Czechoslovakia Dec. 29, 1960
4 Claims. (Cl. 198—232)

This invention relates to conveyorized manufacturing machinery, and more particularly to a safety device for conveyors employed in mechanized assembly operations and other manufacturing operations.

When work pieces are moved between successive work stations on continuous conveyor belts and are worked upon while resting on the conveyor belts, accidents may occur because of faulty placement of work pieces, and because of operator's limbs entering the work stations. Aside from the danger to the operator's health, the conveyor in its movement may cause damage to itself, to the machinery at the work stations to which it conveys the work pieces, and to the work pieces which may be damaged or destroyed if not properly positioned when arriving at the successive work stations.

It is the object of this invention to equip conveyors of the type described with a safety device which will stop conveyor movement upon displacement of a work piece from its proper position, and upon presence of a worker's body in a danger zone.

With this object and others in view, this invention in one of its aspects provides a plurality of sensing arms spacedly mounted on the conveyor frame closely adjacent the proper path of work piece movement. The sensing arms are movable over a short distance with the conveyor belt upon contact with a work piece projecting beyond its proper path, and cause switch means in circuit with the electric drive of the conveyor to stop the drive when the arms move beyond the aforementioned short distance.

The exact nature of this invention as well as other features and advantages thereof will be readily apparent from consideration of the following specification relating to the annexed drawing in which:

FIG. 1 shows a portion of a conveyorized automatic shoe making machine in a perspective view, the machine including a conveyor equipped with a preferred embodiment of the safety device of the invention;

FIG. 2 shows a detail of the apparatus of FIG. 1 in front elevation; and

FIG. 3 is a wiring diagram of the conveyor of FIG. 1.

Referring now to the drawing in detail, and initially to FIG. 1, there is seen the stationary frame 1 of a conveyor the load carrying part of which is an elongated belt composed of hingedly connected substantially rigid plate shaped metal links 20. While only a portion of the belt is seen in FIG. 1, it will be understood that the belt forms a continuous loop trained over drive sprockets and guide wheels in a conventional manner.

The belt is provided at regular intervals with last carriers 22 which may be integrally cast with respective links 20. The last carriers 22 are equipped with non-illustrated fastenings by means of which a last 30 may be secured to each carrier. A shoe drawn over the last 30 may be sequentially moved past the several work stations of the machine by the movement of the belt in the direction of the arrow S. Four work stations are shown diagrammatically in FIG. 1 and are identified respectively by reference characters *h, ch, b,* and *c.* Each work station is mounted on the conveyor frame 1 and is suitably equipped for performing an operation on a partly completed shoe as it passes by on its last 30. Since neither the shoe making machinery nor its specific mode of operation is essential to this invention, details of the individual operating units will not be described nor have the stations been illustrated in detail.

The control device proper includes three brackets 2, 3, 4, each secured to the conveyor frame 1 by screws 5 and spaced from the other brackets in the direction of belt movement. Each bracket carries a sleeve 6. The sleeves are axially aligned along the conveyor belt and slidably receive a rod 7.

Four sensing arms 8, 9, 10, 11 are spacedly fastened to the rod 7 immediately ahead of respective work stations *h, ch, b,* and *c.* They extend upward from the level of the conveyor belt and then across it. While they do not intrude into the prescribed path of a work piece traveling on the conveyor, they are very closely adjacent the work piece path, and are spaced therefrom in different directions for abutment against a work piece which does not follow its prescribed path, that is, a work piece which is not correctly positioned on the corresponding last carrier. The arms are also positioned in such a manner that a workman approaching a work station from the feed end will touch one of the sensing arms before a limb may enter a work station. The danger of any part of a worker's body being drawn into a work station from the discharge end is practically nil in shoe making machinery, and additional sensing arms near the discharge side of the working stations are not required. Obviously, such additional arms may be provided if desired.

One end portion of the rod 7 passes through an opening in a support block 14 in which it is longitudinally slidable. The block 14 is fixed on the frame 1 by means of screws 19. A wedge member 15 is fixed to the end of the rod 7 and prevents its movement in a direction opposite to the direction of conveyor movement beyond a position in which the wedge member 15 abuts against the block as shown in FIG. 2. Movement of the rod 7 in the conveyor direction is resiliently limited by a helical compression spring 13 coiled about the rod 7. One end of the spring 13 abuts against the block 14 whereas the other end abuts against a collar 12 adjustably fastened on the rod 7.

The oblique terminal face 16 of the wedge member 15 cammingly engages a roller 24 rotatable on the free end of a one-armed lever 17 the other arm of which is fastened to a bracket 21 by a pivot 23. The bracket is fixedly fastened to the frame 1. A pad 25 on the lever 17 rests against the push rod 26 of an electric switch 18 in the inoperative position of the safety device illustrated in FIG. 2.

The electrical circuit which connects the switch 18 with the electric drive of the conveyor is shown in FIG. 3. The switch 18 is normally closed, and opens when the push rod 26 is depressed. The switch is arranged in series with a current source and the winding of a relay 27. The single pole single throw contacts of the relay are normally open, and are closed when the relay winding is energized. They control current supply from the aforementioned source to the drive motor 28 which actuates rotation of a pulley or sprocket 29 over which the conveyor belt is trained. The motion transmitting mechanism interposed between the motor and the pulley has been indicated conventionally, but it will be understood that it may include speed changing gears and a Geneva movement or the like to cause stepwise indexing movement of the conveyor belt when the motor 28 rotates continuously. The circuit elements illustrated need not constitute the complete electrical controls of the conveyor as will be readily apparent to those skilled in the art.

The apparatus illustrated operates as follows:

In normal conveyor operation the switch 18 is closed, the relay 27 attracts its armature, and the motor 28 is energized. The conveyor is loaded with lasts 30 which are sequentially moved past the work stations *h, ch, b,* and *c.* The machinery mounted on the conveyor frame at these stations performs operations on a partly completed shoe including a vamp which is mounted on a last 30 at a non-illustrated loading and unloading station arranged between the work stations *ch* and *b.* The last 30 with the vamp mounted thereon is returned to the illustrated portion of the equipment at the station *h,* the conveyor forming a closed loop.

The lasts 30 are of the hinged type in which a toe portion and a counter portion can be angularly moved relative to each other between the positions shown at stations *b* and *h* respectively. These positions will be referred to hereinafter as the "open" and the "closed" position of the last respectively. In the open last position illustrated at station *b,* the vamp fits relatively loosely over the last. In the closed position, the last tensions the vamp, and urges it to conform to the last. Conversely, a vamp pulled over a closed last tends to urge the last into the open position.

The equipment illustrated operates as follows:

Open lasts with vamps pulled over them are conveyed from the non-illustrated loading station to station *b.* The short sensing arm 11 is arranged ahead of the station in such a manner as to pass under the toe part of the last if the last is open. A closed last conveyed to the work station *b* from the loading station abuts against the arm 11 and trips the switch 18 to arrest the conveyor drive.

At the station *b,* the last 30 with the vamp pulled over it is closed by automatic devices which may be of the type disclosed in the commonly assigned co-pending U.S. application Serial No. 162,510, now Patent No. 3,089,162.

The closed vamp is moved from station *b* to station *c* by the stepwise movement of the conveyor belt. Proper closing of the last in station *b* is sensed by the arm 10 which passes above the sole part of the closed last, but is hit by the toe part of the last if last closing and tightening of the vamp was not properly performed at the preceding station. Contact between the arm 10 and an open last 30 trips the switch 18.

At the station *c,* the sole portion of the vamp is preshaped. The last then travels with the partly completed shoe through a non-illustrated oven and returns to the straight conveyor run illustrated in FIG. 1 at station *h.* Any accidental opening of the last between stations *c* and *h* is sensed by the arm 8 in the same manner as an open last is sensed by the arm 10 at station *e.*

At station *h,* heat and pressure are applied to the vamp on which a sole has been placed. Stiffening material in the toe and counter portions of the vamp is simultaneously cured so as to stiffen those portions of the vamp. This is the last manufacturing operation performed on the automatic equipment, and the partly completed shoe is advanced to station *ch* for release of the vamp from the last.

Station *ch* is equipped with an automatic last operating device which may be of the type disclosed in the aforementioned commonly assigned application. The properly positioned last is gripped by jaws and opened at station *ch.* To ensure proper positioning of the last, the arm 9 is arranged ahead of station *ch* and stops the conveyor in the event of misalignment between the last and the last opening jaws. Such misalignment would be primarily caused by accidental or spontaneous premature opening of the last.

The opened last is transferred during the next conveyor step from the station *ch* to the non-illustrated unloading station where the partly completed shoe may be pulled from the vamp, and another vamp mounted for a new cycle of operations.

A misalignment of a shoe or last with any one of the arms 8 to 11 which cannot be remedied by the abutment of an arm against the shoe under the resilient pressure of the spring 13 causes displacement of the rod 7 in the direction of the arrow P (FIG. 2), pivotal movement of the lever 17 in the direction of the arrow D, and stoppage of the conveyor before any damage can be done. The conveyor is similarly stopped when any part of the operator's body should move toward a work station and touch one of the arms 8 to 11. When the misaligned shoe is returned to its proper position, or when the operator's limb is removed from contact with one of the arms, the rod 7 is moved in the direction of the arrow R and conveyor operation is resumed.

While the safety device of the invention has been illustrated for the purpose of the disclosure in its application to a conveyor in automatized shoe making machinery for which the safety device is particularly well suited, it is evident that the utility of this invention is not limited to such an application.

Obviously many modifications and variations of the present invention are possible in the light of the above teachings. It is therefore to be understood that within the scope of the appended claims, the invention may be practiced otherwise than as specifically disclosed.

What we claim is:

1. In a conveyor arrangement,
   (*a*) a frame;
   (*b*) elongated endless belt means on said frame;
   (*c*) electric drive means for actuating movement of said belt means on said frame in a longitudinal direction;
   (*d*) means defining a plurality of work stations adjacent said belt means and spaced from each other in said direction;
   (*e*) means for securing a work piece on said belt means for movement therewith in a predetermined path;
   (*f*) a plurality of sensing arms spacedly mounted on said frame closely adjacent said path for limited movement in said direction, each of said arms being associated with one of said stations; and
   (*g*) switch means in circuit with said drive means and responsive to said limited movement of each of said sensing arms to stop said drive means.

2. In an arrangement as set forth in claim 1, a connecting element fixedly fastened to each of said arms; and an actuating member on said element, said switch means including a switch member in contact with said actuating member and responsive to movement of said actuating member in said direction for interrupting current flow to said drive means.

3. In an arrangement as set forth in claim 2, one of said members having a cam face obliquely inclined relative to said direction, and the other member including cam follower means cooperating with said cam face for transmitting movement of said actuating member to said switch member.

4. In an arrangement as set forth in claim 2, said connecting element being elongated in said longitudinal direction, and said actuating member being mounted on a longitudinal end portion of said connecting element.

References Cited in the file of this patent

UNITED STATES PATENTS

| | | |
|---|---|---|
| 2,345,415 | Nagy | Mar. 28, 1944 |
| 2,374,326 | Bourland | Apr. 24, 1945 |
| 2,674,381 | Cady | Apr. 6, 1954 |